F. F. STANLEY.
LEATHER SPLITTING MACHINE.
No. 11,008. Reissued June 18, 1889.
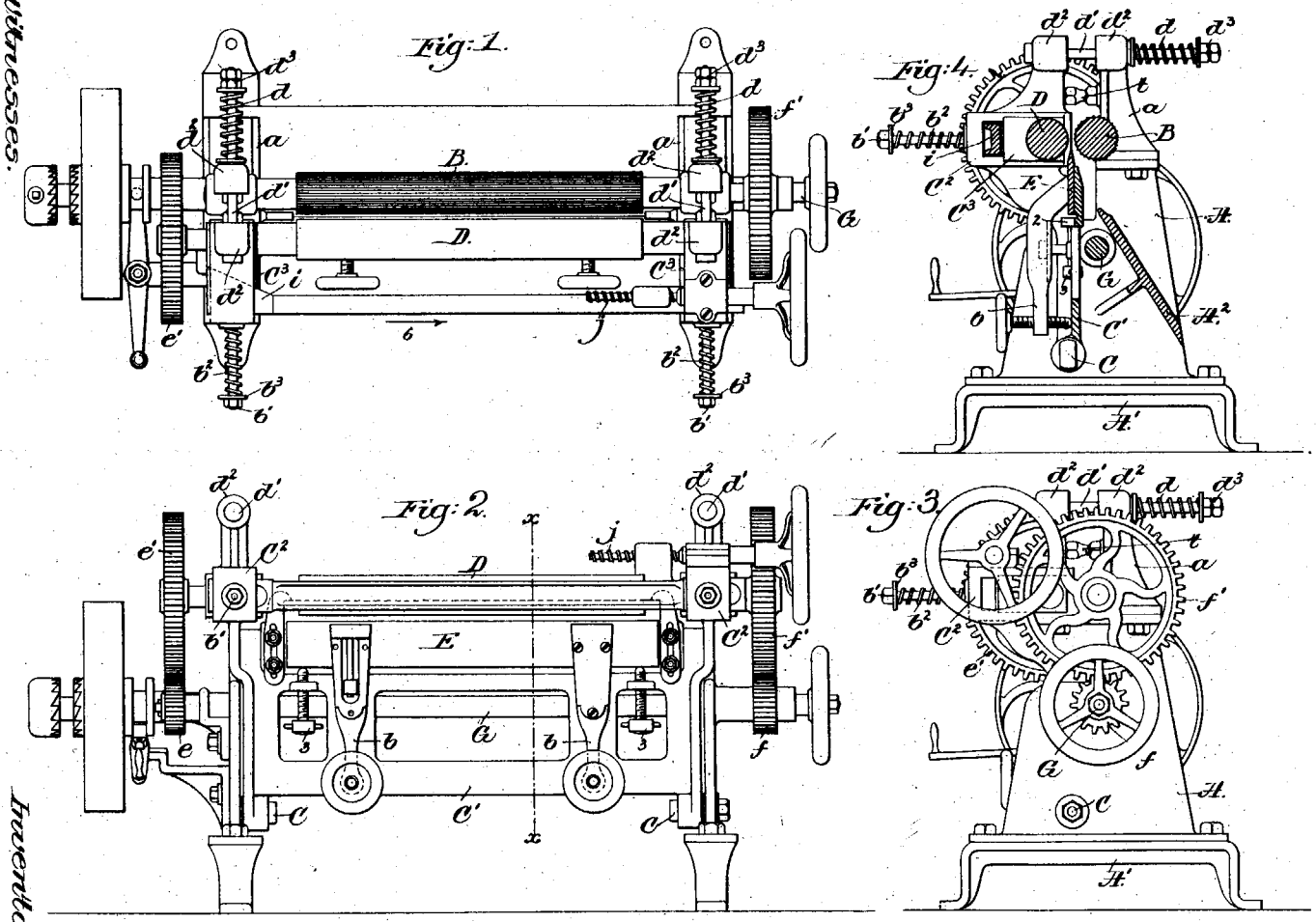
Witnesses.
Frederick L. Emery.
Edgar A. Goddin
Inventor.
Frank F. Stanley,
by Lemby & Gregory Attys.

UNITED STATES PATENT OFFICE.

FRANK F. STANLEY, OF SWAMPSCOTT, MASSACHUSETTS.

LEATHER-SPLITTING MACHINE.

SPECIFICATION forming part of Reissued Letters Patent No. 11,008, dated June 18, 1889.

Original No. 395,759, dated January 8, 1889. Application for reissue filed April 10, 1889. Serial No. 306,734.

*To all whom it may concern:*

Be it known that I, FRANK F. STANLEY, of Swampscott, county of Essex, and State of Massachusetts, have invented an Improvement in Leather-Splitting Machines, of which the following description, in connection with the accompanying drawings, is a specification, like letters on the drawings representing like parts.

This invention has for its object to improve and simplify the construction of leather-splitting machines of the class shown in United States Patent No. 305,240, dated September 16, 1884. In the said patent the feed and gage rolls are each mounted in bearings in levers which have to be adjusted according to the work to be done. In my improved machine the feed-roll has its bearings in a rigid or fixed part of the frame-work, and the knife is applied to and carried by the pivoted yoke or lever which supports the bearings for the gage-roll.

My invention consists, essentially, in the combination, with the feed or pressure roll B, of a movable yoke or frame, and a knife and a gage-roll carried thereby and made movable in unison toward and from the said feed or pressure roll, substantially as will be described.

Figure 1 is a top or plan view of a machine embodying my invention; Fig. 2, a front side view of the same; Fig. 3, a right-hand end view of the machine shown in Fig. 1, and Fig. 4 is a section in the line $x$, Fig. 2.

The frame-work A, mounted on suitable legs A′, has an inclined rib $A^2$, over which passes the skiving or waste. The frame-work has mounted on it suitable stands $a$, having bearings for the journals of the feed or pressure roll B, the said roll being in rigid bearings. The frame-work A has pivoted to it at C a yoke C′, having guideways $C^2$ for the reception of the boxes $C^3$, in which turn the journals of the gage-roll D, the said yoke also having a shoulder, as 2, and next the shoulder lugs for the reception of adjusting-screws 3, upon which rests the under edge of the knife E, which splits the leather, the main body of which passes between the said knife and gage-roll. The knife is clamped in place by the clamping-levers $b$ $b$, or devices of usual construction.

Each box $C^3$ is beveled at its outer end, as shown by dotted lines, Fig. 1, and has extended from it a rod $b'$, which is passed out through a slot in the adjusting wedge or slide $i$, common to the said patent, and through the guideways $C^2$, when each of the said rods is provided with a spring $b^2$ and nut $b^3$, the latter regulating by its position on the said rod the effective force of the said spring, the springs $b^2$ normally acting to move the boxes $C^3$ and the gage-roll away from the knife E; but the said springs cannot move the boxes to change the relative positions of the said gage-roll and knife, except the wedge or slide $i$ be moved longitudinally. The bar $i$ has wedge-surfaces which, when the said bar is moved longitudinally in the direction of the arrow 6, Fig. 1, and against the inclined rear ends of the boxes, act to move the gage-roll nearer the knife. In this my invention the knife and gage-roll, once adjusted correctly, thereafter move toward and from the fixed feed or pressure roll in unison, but in a yielding manner, due to the springs $d$ on the rods $d'$, extended from each end of the yoke C′ through boxes $d^2$, the force of the springs $d$ being regulated by nuts $d^3$. The yoke C′ is so controlled and pivoted that its opposite ends move forward and backward uniformly.

The gage-roll D and feed or pressure roll B are rotated from the main shaft G by intermediate gearing, as in the said Patent No. 305,240. The screw-shaft $j$, to adjust or move the bar $i$, is common to the said patent.

The strength and durability of the machine and its accuracy of operation in splitting a hide to uniform thickness are greatly augmented by mounting the knife and the gage-roll on one and the same strong frame, so that the said knife and roll are made to move in perfectly parallel planes. Permitting the knife to move toward and from the feed-roll with the gage-roll obviates mounting the feed-roll in adjustable bearings.

The extent of movement of the yoke C′ toward the feed-roll is limited to a nicety by stop-screws, as $t$, near each end of the standards $a$.

I claim—

1. In a leather-splitting machine, the combination, with the positively-rotated feed or pressure roll B, of the movable yoke or frame and the knife, and the gage-roll carried thereby and made movable in unison toward and from the said feed or pressure roll, substantially as described.

2. In a leather-splitting machine, the pivoted yoke or frame C, the knife carried thereby, the gage-roll mounted in movable boxes sustained in the said yoke, and wedge-bar to adjust the said boxes, combined with the feed-roll having rigid bearings, and rod *d'*, and springs, as *d*, to enable the said yoke and the parts carried by it to yield toward and from the said feed-roll, substantially as described.

3. In a leather-splitting machine, the combination, with the feed or pressure roll B, of the movable yoke or frame, and the knife, and the gage-roll carried thereby and made movable in unison toward and from the said feed or pressure roll, and with the stop-screws, substantially as described.

FRANK F. STANLEY.

Witnesses:
GEO. W. GREGORY,
FREDERICK L. EMERY.